United States Patent

McLaughlin

Patent Number: 5,414,952
Date of Patent: May 16, 1995

[54] FISHING LURE

[76] Inventor: Gerald G. McLaughlin, 1800 Bidwell Way, Sacramento, Calif. 95818

[21] Appl. No.: 134,302

[22] Filed: Oct. 8, 1993

Related U.S. Application Data

[63] Continuation-in-part of Ser. No. 34,072, Mar. 22, 1993, abandoned.

[51] Int. Cl.⁶ ............................................. A01K 85/00
[52] U.S. Cl. ................................................... 43/42.5
[58] Field of Search .................... 43/42, 42.5, 42.51, 43/42.52

[56] References Cited

U.S. PATENT DOCUMENTS

| | | | |
|---|---|---|---|
| D. 241,640 | 9/1976 | Miralles . | |
| 839,917 | 1/1907 | Chapman | 43/42.51 |
| 3,141,255 | 7/1964 | Randall | 43/42.11 |
| 3,896,580 | 7/1975 | Williams, Jr. | 43/42.31 |

FOREIGN PATENT DOCUMENTS 1115052  12/1981  Canada ............................... 43/42.13

*Primary Examiner*—Kurt Rowan

[57] ABSTRACT

A fishing lure of the type to be cast and retrieved or trolled comprising a first spoon element (20R) and a second spoon element (20L). Each spoon element (20R) and (20L) has a first generally concave side face surface (34R) and (34L) and a second generally convex side face surface (32R) and (32L). Each spoon element (20R) and (20L) has a first side edge (24R) and (26R) and a second side edge (24L) and (26L). The side edges (24R) and (26R) and (24L) and (26L) generally converge in forward and rearward directions from each spoon element's widest segment (25R) and (25L). Each spoon element (20R) and (20L) is somewhat arcuate longitudinally, each curving inward in a forward direction toward its concave side face surface 34R and 34L generally from its widest segment 25R and 25L and somewhat curving inward in a rearward direction toward the concave side face surface 34R and 34L from its widest segment 25R and 25L. Each spoon element's widest segment (25R) and (25L) is disposed between the middle and the front end (28R) and (28L) of each spoon element (20R) and (20L). The spoon elements (20R) and (20L) are conjoined by a nose portion (50) in a fixed, mutually opposed, mirror image relationship with the generally concave side face surfaces (34R) and (34L) being disposed inwardly and the generally convex side face surfaces (32R) and (32L) being disposed outwardly. The front ends of the spoon elements (28R) and (28L) are spaced apart by the conjoining nose portion (50). The side edges of the spoon elements 24R and 24L and 26R and 26L are generally spaced apart longitudinally. The fishing lure (10) has a fishhook attaching means (42) at the trailing end (16) for attachment of a treble hook (43) or the like and a fishing line attaching means (40) at the leading end (14) for attachment of a fishing line (45).

20 Claims, 4 Drawing Sheets

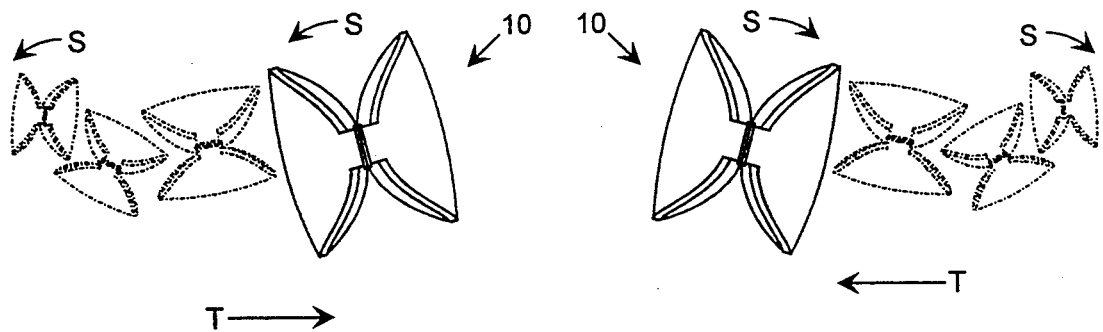
Figure 6
Figure 7
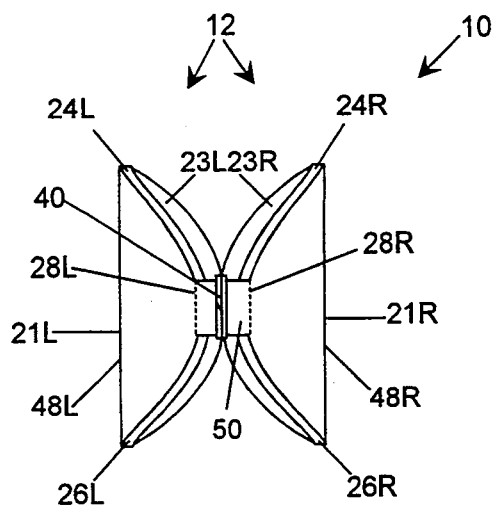
Figure 8
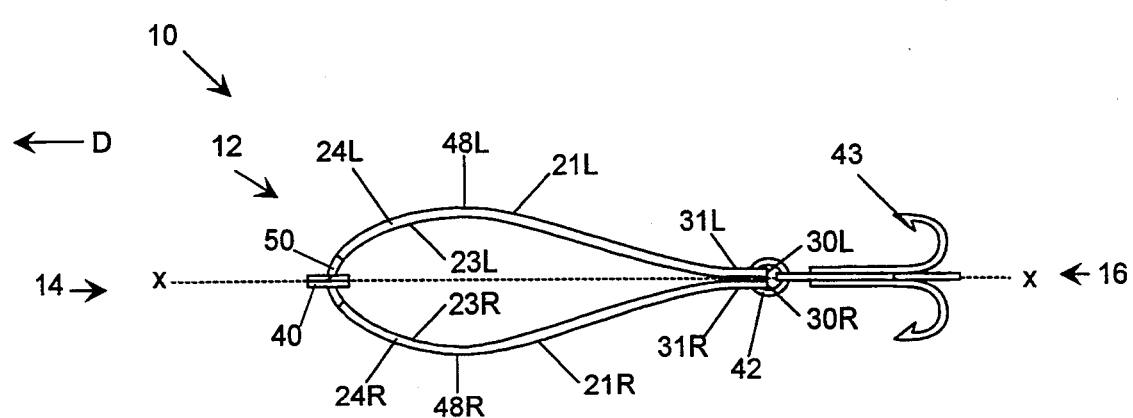
Figure 9

FISHING LURE

This is a continuation-In-Part of application Ser. No. 08/034,072 filed Mar. 22, 1993, now abandoned.

BACKGROUND—FIELD OF INVENTION

The invention is related to fishing lures of the type to be cast and retrieved or trolled, specifically flash-type bait.

BACKGROUND—DESCRIPTION OF PRIOR ART

Fish are among the most numerous vertebrates, and one of the most primitive, whose evolutionary roots go back 500 million years. The primitive nature of fish is fortunate for anglers. Even our best efforts as anglers would be ineffective if fish had developed a higher level of intelligence. The key to taking fish is offering them something that resembles or comes close to imitating the food that they normally eat. Most game fish are pisciverous and prey on smaller fish.

Fish move through the water by way of rapid flexures of the body and through the lateral sculling action of the caudal peduncle that moves the caudal fin from side to side. Small fish do not swim fast or move through the water at a steady pace. Instead, the secret of survival is a matter of dodging and darting the larger and faster predatory fish. As small fish dodge and dart through the water to escape the larger and faster predatory fish, they displace water (turbulence) creating sonic waves (sound). It also results in reflection of light (flashing).

Fish have a well-developed sense of vision having a sharp view of their entire surroundings. Fish having larger eyes in proportion to the size of their head tend to be predatory. It is believed that fish with larger eyes have a more acute sense of vision.

Many freshwater fish have a well-developed sense of hearing, possessing a chain of small bones that connect their swim bladder to their inner ear. This allows them to pickup middle and higher sound vibrations. Most freshwater fishes also possess another sensory organ, the lateral line, which is a pressure sensing organ located on the lateral body wall and dorsal head area. It is believed that it functions as an ultra-sensitive current and pressure sensing system and that some predatory fish can locate their prey in total darkness using this organ.

While generalizations based on body shape alone must be made cautiously due to the large numbers of families, species and subspecies, fish are typically elliptical or ovate in shape tapering toward the front and rear end of their bodies. They typically have a length more than twice their depth. The classical body shape, exemplified by trout, is adapted for speed and is more streamlined having a length typically several times its depth. Deep-bodied fish, exemplified by sunfish, are adapted for maneuverability more than speed. Deep-bodied fish tend to be more ovate and have a length generally two to three times their depth. Ovate fish tend to be broader at the front end. The shape and configuration of the caudal, pectoral, pelvic, anal or dorsal fins depend on whether the body shape is adapted for speed or maneuverability.

Pisciverous fish are attracted visually to the appearance of small fish and the reflections of light (flashing) as they move through the water. They are also attracted audibly to the sonic waves (sound) created by small fish moving through the water.

Fishing spoons, plugs, and spinners are typically intended to represent small fish in different respects. There are undoubtedly hundreds, if not thousands, of different variations of each of these types of fishing lures. It is the belief of the applicant that each fishing lure invention was intended by its inventor to provide some particular effect or effects, either visual or audible. For example, plugs generally look like small fish. On the other hand, most spinners and spoons do not generally look like fish but tend to reflect light and mimic the flashing created by a small fish as it moves through the water. All lures, by displacing water create turbulence and as such emit sonic waves (sound).

While plugs generally look like fish, they typically do not reflect as much light as a spinner or spoon. In addition, the "action" of a plug is a wobbling or wiggling rather than a dodging or darting movement. On the other hand, while most spoons and spinners generally reflect more light, they do not realistically look like fish. The "action" of a spinner is dependent upon the method of retrieval but can be generalized as being relatively straight and continuous. Spoons have varying degrees of "action," but it is more of a wobbling movement about its front end rather than a random dodging or darting.

OBJECTS AND ADVANTAGES

The objects and advantages of this invention are to provide a fishing lure that combines and improves on the advantages of plugs, spoons and spinners resulting in a fishing lure with enhanced attractiveness to game fish.

The general objects of the present invention are to provide a new and improved fishing lure that, when cast and retrieved or trolled, (1) simulates the random dodging and darting of smaller fish, (2) visually simulates the reflective nature of fish, (3) visually has a realistic fish-like appearance and, (4) audibly simulates a smaller fish moving through the water.

Another object of the present invention is to provide a fishing lure that can be modified in appearance, at minimal cost, by applying a variety of light reflecting patterns to its surfaces to visually attract certain species of game fish.

A further object of the present invention is to provide a fishing lure that by modifying the length, width, and general shape can be made to visually represent certain species of fish.

One advantage of the present invention is that the fishing lure has two outwardly disposed, generally convex side face surfaces that are disposed in a manner that provides a more fish-like appearance resembling the two convex lateral sides of a fish.

Another advantage of the present invention is that the fishing lure has two reflective convex surfaces imparting and diffusing more light than a single convex surface or concave surface (concave surfaces focus light rather than diffuse it).

Still another advantage of the present invention is that the fishing lure, when drawn through water has random two-way rotation that imparts and diffuses more light in more directions as the lure spins about its longitudinal axis.

Another advantage of the present invention is that the fishing lure, when drawn through the water, has a random traversing motion providing a more realistic simulation of the dodging and darting of a small fish.

Other objects, advantages, and utilities of the present invention will become apparent and understood in the following detailed description.

REFERENCE TO DRAWINGS

FIG. 6 is a front (leading end) elevational view showing the fishing lure of the present invention rotating left about its longitudinal axis and traversing right.

FIG. 7 is a front (leading end) elevational view showing the fishing lure of the present invention rotating right about its longitudinal axis and traversing left.

FIG. 8 is a front (leading end) elevational view of an alternate embodiment of the present invention where the spoon elements are longitudinally concavo-convex and vertically plano-plan.

FIG. 9 is a top elevational view of the fishing lure of FIG. 8.

DETAILED DESCRIPTION AND SPECIFICATION OF THE INVENTION

One embodiment of the fishing lure of the present invention is shown in FIGS. 1A–1F. The fishing lure 10 has a body 12 comprised of two substantially identical spoon elements 20R and 20L. The first element 20R has a length L generally greater than its width W, a first side edge 24R, a second side edge 26R, a front end denoted by 28R in FIGS. 1A and 1C, a rear edge 30R, a generally convex side face surface 32R and a generally concave side face surface 34R. The element 20R has a wider segment denoted by the dotted line 25R in FIG. 1C that is disposed between the middle and the front end 28R of the element 20R. The side edges 24R and 26R generally converge in a rearward direction from the element's widest segment 25R forming a rear edge 30R. The side edges 24R and 26R generally converge in a forward direction from the element's widest segment 25R toward the front end 28R. The element 20R is arcuate longitudinally, curving inward in a forward direction toward the concave side face surface 34R generally from the widest segment 25R and somewhat curving inward in a rearward direction toward the concave side face surface 34R generally from the widest segment 25R. The rearmost portion of the spoon element, denoted as 31R and generally being that portion of the spoon element aft of the broken line 33R, is preferably planar and preferably bent at an obtuse angle toward the convex side face surface 32R generally along a line, also denoted generally by the dotted line 33R, that divides the convex side face surface 32R from the planar rear portion 31R. The dividing line 33R is generally located forward of an opening 36R provided near the rear edge 30R. It will be obvious to those skilled in the art of fishing lures that the dividing line 33R, could be curved, straight or angular.

Figure 1A:
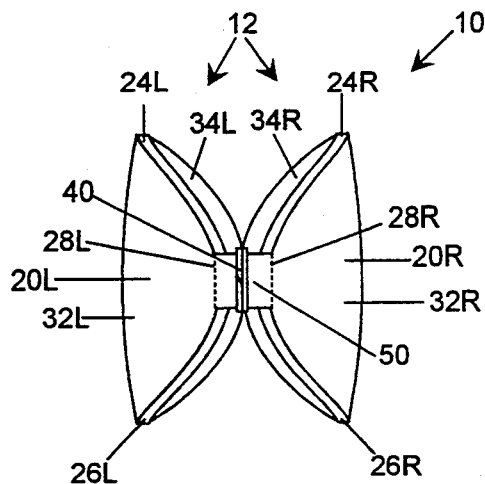
FIG. 1A is an enlarged front (leading end) elevational view of an exemplary fishing lure of the present invention.
Figure 1B:
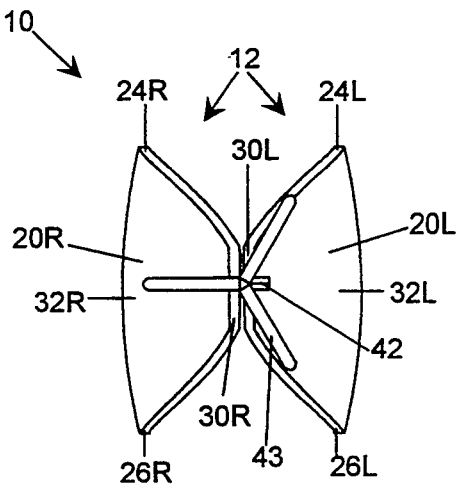
FIG. 1B is an enlarged rear (trailing end) elevational view of the fishing lure of FIG. 1A.
Figure 1C:
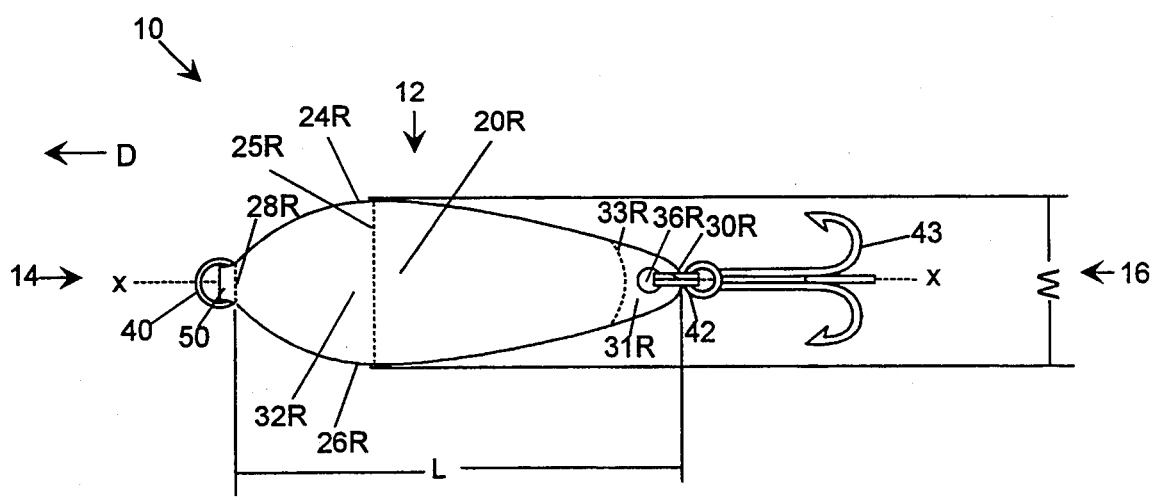
FIG. 1C is a right side elevational view of the fishing lure of FIG. 1A.
Figure 1D:
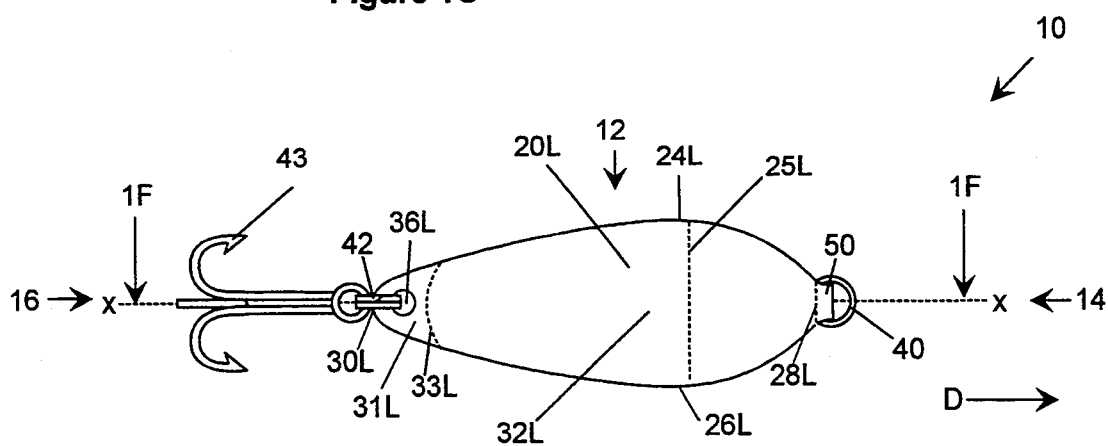
FIG. 1D is a left side elevational view of the fishing lure of FIG. 1A.
Figure 1E:
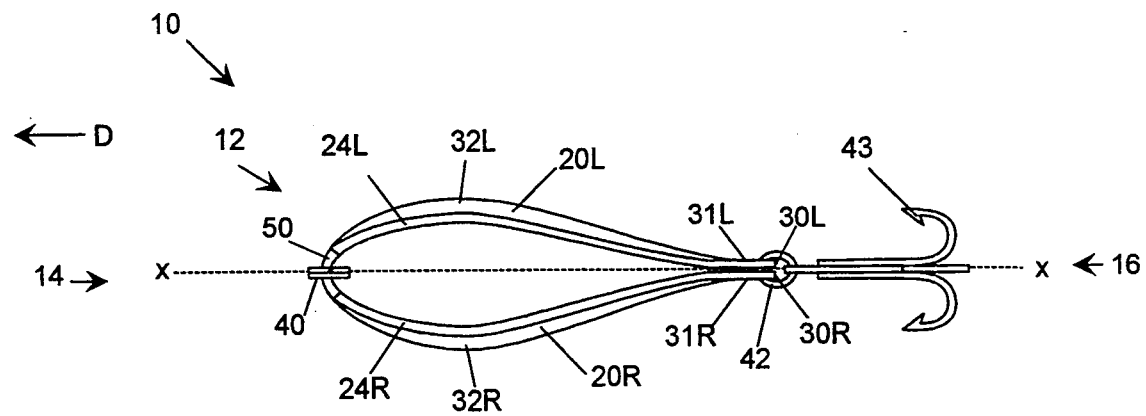
FIG. 1E is a top plan view of the fishing lure of FIG. 1A.
Figure 1F:
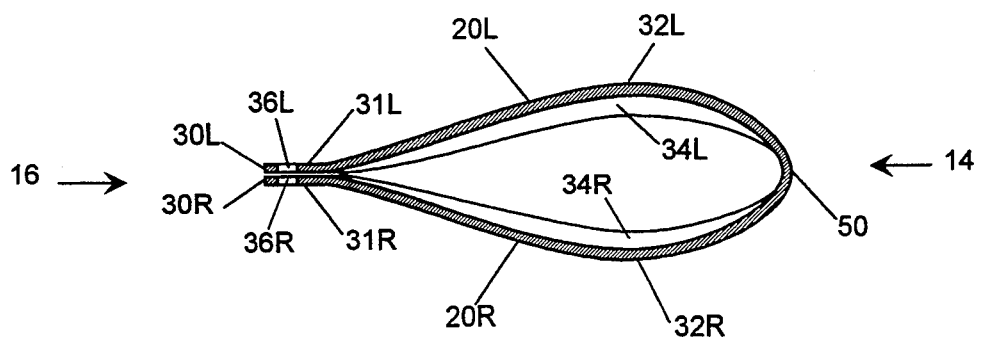
FIG. 1F is a fragmentary cross-sectional taken substantially on the broken line 1F—1F of FIG. 1D.

The spoon elements 20R and 20L, as shown in FIGS. 1A–1F, are disposed in a fixed, mutually opposed, mirror image relationship with the generally concave side face surfaces 34R and 34L being disposed inwardly and the generally convex side face surfaces 32R and 32L being disposed outwardly. The means to dispose the spoon elements 20R and 20L in a fixed, mutually opposed, mirror image relationship, is a nose portion 50 that conjoins the front ends of the spoon elements 28R and 28L. As can be seen in FIG. 1E, the nose portion 50 is preferably arcuate between the front ends of the spoon elements 28R and 28L. As can be seen in FIG. 1A and FIG. 1E, the front ends of the spoon elements 28R and 28L are spaced apart by the nose portion 50. The side edges of the spoon elements 24R and 24L and 26R and 26L are generally spaced apart longitudinally between the nose portion 50 and the planar rear portions 31R and 31L. The planar rear portions 31R and 31L, as can best be seen in FIGS. 1B and 1E, abut one another and are disposed in a parallel mirror image relationship.

A ring member 42 is provided at the trailing end 16 of the fishing lure 10 and extends through the openings 36R and 36L and permits attachment of a treble hook 43 or the like. It will be obvious to those skilled in the art of fishing lures that different fishhook attaching means could be provided at the trailing end 16 of the fishing lure 10 without departing from the concept of the present invention. For example, a split ring, snap fitting or welded ring could extend through the openings 36R and 36L to permit the attachment of a fishhook. Additionally, an open shank double or treble hook or the like could be attached directly to the trailing end 16 of the fishing lure.

Figure 4:
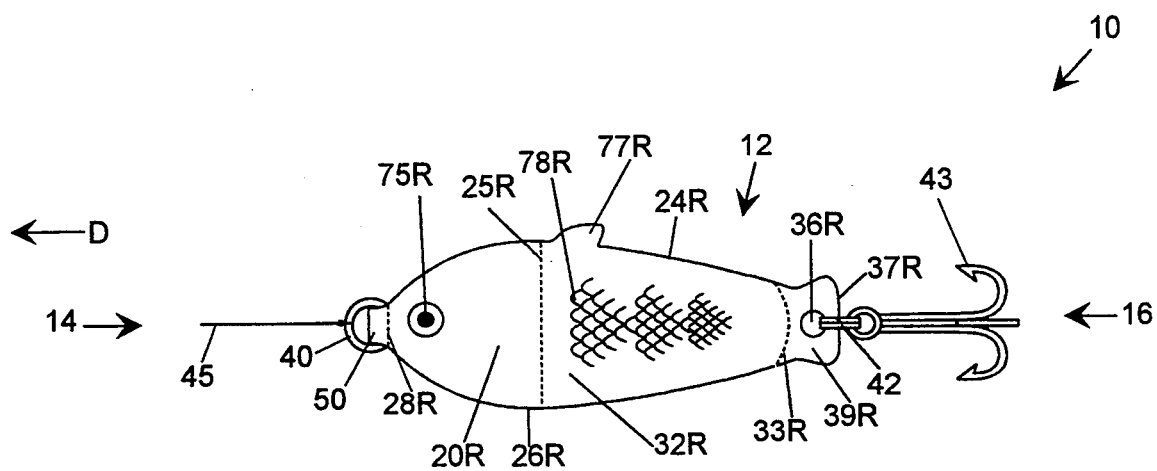
FIG. 4 is a right side elevational view of another alternate embodiment of the fishing lure, where patterns have been stamped and applied to the outwardly disposed convex side face surfaces and the rear portion is shaped like the caudal fin of a fish.

A fishing line attaching means comprising a ring member 40, as can best be seen in FIGS. 1A and 1E, is provided at the leading end 14 and extends around the conjoining nose portion 50 to permit attachment of a fishing line 45 as illustrated in FIG. 4. It will be obvious to those skilled in the art of fishing lures that different fishing line attaching means could be provided at the leading end 14 of the fishing lure 12 without departing from the concept of the present invention. For example, a split ring, snap fitting, snap swivel or a welded ring could extend around the nose portion 50 or an eyelet could extend through an opening provided in the nose portion 50. Additionally, the fishing line 45 could be attached directly to the conjoining nose portion 50.

Figure 2:
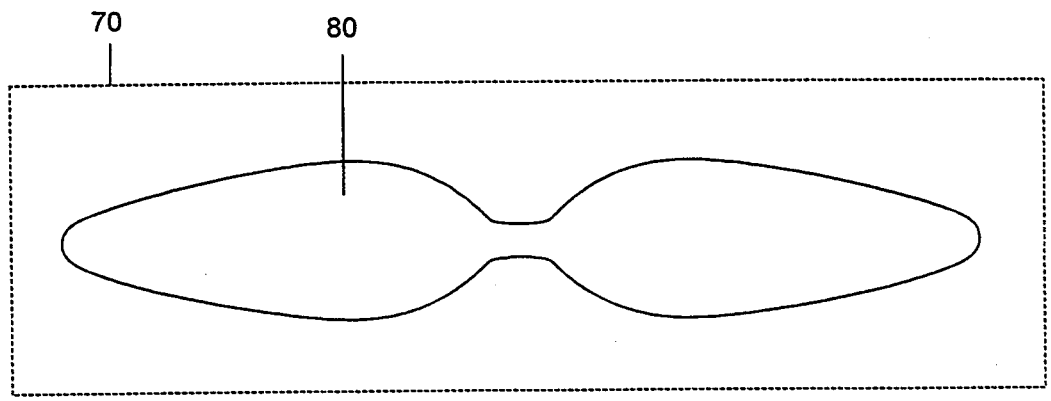
FIG. 2 is a plan view of a sheet of metal and a blank from which the fishing lure of FIGS. 1A–1F and FIG. 3 can be made.

As shown in FIG. 2, the body 12 of the fishing lure 10 is preferably made from a single blank 80 cut from a sheet of metal denoted by the dotted line 70 and is formed by stretching and deforming the metal beyond its elastic limit. The preferred method of manufacture is the use of a progressive die. To provide reflectiveness, the preferred sheet metal is a pre-polished or pre-plated corrosive-resistant metal, for example, polished stainless steel. It will be apparent to those skilled in the art of fishing lures, that the body 12 of the fishing lure 10 could also be manufactured of unfinished sheet metal such as brass and then plated or chromed to provide reflectiveness. The body 12 of the fishing lure 10 could also be die cast from aluminum or injection molded from plastic and could incorporate rhinestone-like or prism-like light reflecting materials.

Figure 3:
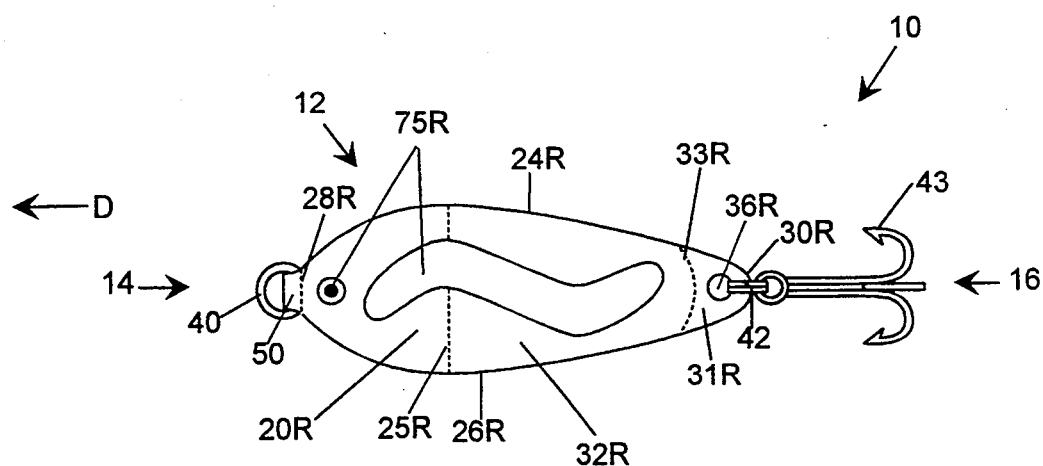
FIG. 3 is a right side elevational view of an alternate embodiment of the fishing lure, where patterns have been applied to the outwardly disposed convex side face surfaces.

In the embodiment of FIG. 3, patterns 75R have been applied to the outwardly disposed convex side face surfaces 34R of the spoon element 20R. The patterns 75R, which may be painted on, may be, for example, chartreuse in color. Alternately, the patterns 75R may comprise adhesively backed pieces of brightly colored plastic or polyester film that are secured in position and may incorporate rhinestone-like or prism-like reflecting components or the like.

In the embodiment of FIG. 4, patterns 78R have been stamped on the outwardly disposed convex side face surface 32R. The patterns 78R could be stamped during manufacture using tool and die or the lure could be manufactured of a pre-textured sheet metal. The rear portion 39R of the spoon element 20R shown in FIG. 4 generally has the peripheral shape of the caudal fin of a fish. A pair of appendages 77R and 77L are symmetrically provided along the side edges 24R and 24L to imitate the dorsal fins of a fish. The rear edge 37R of the rear portion 39R limits the forward extension of the ring member 42 and hook 43 to help prevent fouling of the fishing lure 10 when cast or trolled as it descends in a body of water.

Figure 5:
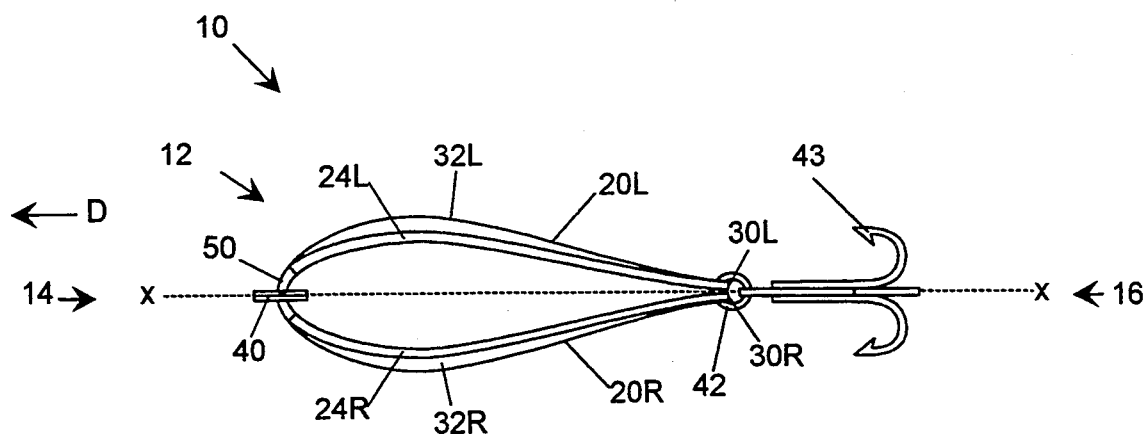
FIG. 5 is a top elevational view of still another alternate embodiment of the fishing lure where the rear edges of the spoon elements abut one another.

FIG. 5 is an alternate embodiment of the present invention similar to the embodiments of FIGS. 1A–1E except the rearmost portions of the spoon elements 31R and 31L aft of the broken line 33R are not bent at obtuse angles toward their convex side face surfaces along a dividing line 33R and 33L and disposed in a parallel mirror image relationship. In this embodiment the spoon elements 20R and 20L are disposed entirely in a mutually opposed, mirror image relationship. The front ends of the spoon elements 28R and 28L are spaced apart by a conjoining nose portion 50. The side edges of the spoon elements 24R and 24L and 26R and 26L are generally spaced apart longitudinally. The rear edges 30R and 30L of the spoon elements abut one another.

FIGS. 8–9 show an alternate embodiment of the present invention. The spoon elements 21R and 21L have the same peripheral shape and arcuate configuration as the embodiments of FIGS. 1A–1E and FIG. 3. The only difference being that the spoon elements 21R and 21L are vertically plano-plan. Each spoon element 21R and 21L has a somewhat longitudinally concave side face surface 23R and 23L and a somewhat longitudinally convex side face surface 48R and 48L. The somewhat longitudinally concave side face surfaces 23R and 23L are disposed inwardly and the somewhat longitudinally convex side face surfaces 48R and 48L are disposed outwardly. Each spoon element 21R and 21L has a planar rear portion 31R and 31L that is preferably bent at an obtuse angle toward its longitudinally convex side face surface 48R and 48L. The planar rear portions 31R and 31L abut one another and are disposed in a parallel mirror image relationship

SUMMARY

It will now be apparent that a fishing lure 10 has been provided comprising two substantially identical spoon elements 20R and 20L, each having a length that is generally greater than its width. Each spoon element 20R and 20L has a first side edge 24R and 24L and a second side edge 26R and 26L. The side edges 24R and 26R and 24L and 26L generally converge in forward and rearward directions from each spoon element's widest segment 25R and 25L. Each spoon element's widest segment 25R and 25L is disposed between the middle and the front end 28R and 28L of each spoon element 20R and 20L. Each spoon element has a generally concave side face surface 34R and 34L and a generally convex side face surface 32R and 32L. The elements 20R and 20L are somewhat arcuate longitudinally, each curving inward in a forward direction toward its concave side face surface 34R and 34L generally from its widest segment 25R and 25L and somewhat curving inward in a rearward direction toward its concave side face surface 34R and 34L generally from its widest segment 25R and 25L. The spoon elements 20R and 20L are conjoined in a fixed, mutually opposed, mirror image relationship with the generally concave side face surfaces 34R and 34L being disposed inwardly and the generally convex side face surfaces 32R and 32L being disposed outwardly by a nose portion 50 that conjoins the front ends of the spoon elements 28R and 28L. The nose portion 50 is preferably arcuate between the front ends of the spoon elements 28R and 28L. The front ends of the spoon elements 28R and 28L are spaced apart by the nose portion 50. The side edges of the spoon elements 24R and 24L and 26R and 26L are generally spaced apart longitudinally. Each element can be provided with a rear portion 31R and 31L that is planar and preferably bent at an obtuse angle toward its convex side face surface 32R and 32L generally along a dividing line generally denoted as 33R and 33L. Each dividing line 33R and 33L is generally disposed forward of an opening 36R and 36L provided near the rear edge 30R and 30L of each spoon element 20R and 20L. As shown in FIGS. 1B and 1E, the planar rear portions 31R and 31L abut one another and are disposed in a parallel mirror image relationship.

A split ring 42 is provided at the trailing end 16 of the fishing lure 10 and extends through the openings 36R and 36L and permits attachment of a treble hook 43 or the like.

A fishing line attaching means comprising a split ring 40 is provided at the leading end 14 and extends around the conjoining nose portion 50 to permit attachment of a fishing line 45.

When the lure 10 of the present invention is cast and retrieved or trolled, it has a movement that can be characterized as a dodging and darting action that has been highly effective in catching different species of fish. The fishing lure 10 has random two-way rotation about its longitudinal axis x—x. As generally depicted in FIG. 6 and FIG. 7, as the fishing lure 10 rotates (spins) S about its longitudinal axis x—x, it traverses T through the water in a direction opposite of its direction of rotation about its longitudinal axis x—x. FIG. 6 shows the fishing lure 10 rotating S left about its longitudinal axis and traversing T right. FIG. 7 shows the fishing lure 10 rotating S right about its longitudinal axis and traversing T left. The front ends of the spoon elements 28R and 28L are spaced apart by the nose portion 50. The side edges of the spoon elements 24R and 24L and 26R and 26L are generally spaced apart longitudinally. As can best be seen in FIG. 1A, FIG. 1E and FIGS. 5-7, the front portions of the convex side face surfaces 32R and 32L of the spoon elements 20R and 20L, generally being that portion of each spoon element 20R and 20L forward of its widest segment 25R and 25L, are disposed at an angle to the longitudinal axis x—x of the fishing lure 10 in relation to the direction of retrieval or troll D. As can also be seen in FIG. 1A, FIG. 1E and FIGS. 5-7, the rear portions of the concave side face surfaces 34R and 34L of the spoon elements 20R and 20L, generally being that portion of each spoon element 20R and 20L aft of its widest segment 25R and 25L, are also disposed at an angle to the longitudinal axis x—x of the fishing lure 10 in relation to the direction of retrieval or troll D. The water acts against these waterfoil surfaces to create waterfoil resistance to causes the lure 10 to randomly rotate S about its longitudinal axis x—x. The rotation S of the lure 10, and the waterfoil resistance of the waterfoil surfaces causes the lure 10 to randomly traverse T in a direction opposite its direction of rotation S about its longitudinal axis x—x. Angular changes of the longitudinal axis x—x of the fishing lure 10 to the direction D of retrieval or troll will cause the fishing lure 10 to randomly change its direction of rotation S and traversal T. The convex side face surfaces 32R and 32L of the fishing lure 10 reflect and diffuse a maximum amount of light in a maximum number of directions as the fishing lure 10 rotates about its longitudinal axis x—x simulating the reflective nature of fish and thus attracting fish. The convex side face surfaces 32R and 32L also provide a more realistic fish-like representation resembling the convex lateral sides of a fish and are visually attractive to fish. The rotation S and traversing T movement of the fishing lure 10, as it is drawn through the water, displaces water and thus creates sonic waves that audibly attract fish. The appearance of the fishing lure 10 can be modified, at minimal cost, by applying a variety of light reflecting patterns 75 to its surfaces to visually attract certain species of game fish.

The shape and size of the elements 20R and 20L as illustrated in FIGS. 1A-1E and FIGS. 3-4 are exemplary of the fishing lure of the present invention and can be varied somewhat without departing from the concept of the invention. For example, appendages could be provided along the side edges 24R and 24L and 26R and 26L resembling the various fins of fish. In another example, the width W, length L and widest segment 25R and 25L of the spoon elements 20R and 20L could be varied to imitate the various body shapes of fish. In a further example, openings could be provided in the spoon elements 20R and 20L along the side edges 24R and 26R and 24L and 26L, or a rotatably-mounted propeller-type blade could be provided at the leading end 14 or trailing end 16 of the fishing lure 10 to create additional turbulence as the fishing lure 10 is drawn through the water. Other possibilities include a fishhook concealing skirt comprising a plurality of thin, flexible members that could be attached at the trailing end of the lure 16.

All such modifications and embodiments are believed to be within the sphere and scope of the present invention as defined by the claims appended hereto.

What is claimed is:

1. A fishing lure that, when drawn through the water, has random two-way rotation about its longitudinal axis and randomly traverses in a direction opposite of its direction of rotation about said longitudinal axis comprising:
   A. A fishing lure body of unitary body construction comprising:
      (i.) a first spoon element having a length greater than its width, said spoon element having a first side edge and a second side edge, said side edges converging in forward and rearward directions from said spoon element's widest segment, said spoon element's widest segment being located between the middle and the front end of said spoon element, said rearwardly converging side edges forming a rear edge at the rear end of said spoon element, said spoon element having a first concave side face surface and a second convex side face surface and said spoon element being arcuate longitudinally;
      (ii.) a second spoon element substantially identical to said first spoon element;
      (iii.) said first and second spoon elements being conjoined by a nose portion, whereby said first and second spoon elements are disposed in a fixed, mutually opposed mirror image relationship, whereby said concave side face surfaces are disposed inwardly and said convex side face surfaces are disposed outwardly and whereby said rear edges of said spoon elements abut one another; and
      (iv.) said lure body having means for attaching a fishing line to the leading end and means for attaching a fishhook to the trailing end; and
   B. At least one fishhook provided at the trailing end of said lure body.

2. The fishing lure of claim 1 wherein said means for attaching a fishing line comprises a ring member which extends around said nose portion.

3. The fishing lure of claim 1 wherein said means for attaching a fishhook comprises a pair of apertures, each of said apertures being symmetrically provided near the rear edge of each of said spoon elements.

4. The fishing lure of claim 3 wherein said means for attaching a fishhook further includes a ring member which extends through said pair of apertures.

5. The fishing lure of claim 1 wherein at least one of said spoon elements has brightly colored patterns are applied to its generally convex side face surface.

6. The fishing lure of claim 1 wherein the extreme rear portions of said spoon elements are generally shaped like the caudal fin of a fish.

7. The fishing lure of claim 1 wherein appendages are symmetrically provided along said side edges of said spoon elements imitating the various fins of fish.

8. A fishing lure that, when drawn through the water, has random two-way rotation about its longitudinal axis and randomly traverses in a direction opposite of its direction of rotation about said longitudinal axis comprising:
   A. A fishing lure body of unitary body construction comprising:
      (i.) a first spoon element having a length greater than its width, said spoon element having a first side edge and a second side edge, said side edges converging in forward and rearward directions from said spoon element's widest segment, said spoon element's widest segment being located between the middle and the front end of said spoon element, said rearwardly converging side edges forming a rear edge at the rear end of said spoon element, said spoon element having a first concave side face surface and a second convex side face surface, said spoon element being arcuate longitudinally and said spoon element having a planar rear portion;

(ii.) a second spoon element substantially identical to said first spoon element;

(iii.) said first and second spoon elements being conjoined by a nose portion, whereby said first and second spoon elements are disposed in a fixed, mutually opposed mirror image relationship, whereby said concave side face surfaces are disposed inwardly and said convex side face surfaces are disposed outwardly and whereby said planar rear portions abut one another and are disposed in a parallel mirror image relationship; and (iv.) said lure body having means for attaching a fishing line to the leading end and means for attaching a fishhook to the trailing end; and B. At least one fishhook provided at the trailing end of said lure body.

9. The fishing lure of claim 8 wherein said means for attaching a fishing line comprises a ring member which extends around said nose portion.

10. The fishing lure of claim 8 wherein said means for attaching a fishhook comprises a pair of apertures, each of said apertures being symmetrically provided near the rear edge of each of said spoon elements.

11. The fishing lure of claim 10 wherein said means for attaching a fishhook further includes a ring member which extends through said pair of apertures.

12. The fishing lure of claim 8 wherein at least one of said spoon elements has brightly colored patterns are applied to its generally convex side face surface.

13. The fishing lure of claim 8 wherein the extreme rear portions of said spoon elements are generally shaped like the caudal fin of a fish.

14. The fishing lure of claim 8 wherein appendages are symmetrically provided along said side edges of said spoon elements imitating the various fins of fish.

15. A fishing lure that, when drawn through the water, has random two-way rotation about its longitudinal axis and randomly traverses in a direction opposite of its direction of rotation about said longitudinal axis comprising:

A. A fishing lure body of unitary body construction comprising:

(i.) a first element having a length greater than its width, said element having a first side edge and a second side edge, said side edges converging in forward and rearward directions from said element's widest segment, said element's widest segment being located between the middle and the front end of said element, said rearwardly converging side edges forming a rear edge at the rear end of said element, said element having a first side face surface and a second side face surface, said element being arcuate longitudinally and said element having a planar rear portion;

(ii.) a second element substantially identical to said first element;

(iii.) said first and second elements being conjoined by a nose portion, whereby said first and second elements are disposed in a fixed, mutually opposed mirror image relationship, whereby said first side face surfaces are disposed inwardly and said second side face surfaces are disposed outwardly and whereby said planar rear portions abut one another and are disposed in a parallel mirror image relationship; and (iv.) said lure body having means for attaching a fishing line to the leading end and means for attaching a fishhook to the trailing end; and B. At least one fishhook provided at the trailing end of said lure body.

16. The fishing lure of claim 15 wherein said means for attaching a fishing line comprises a ring member which extends around said nose portion.

17. The fishing lure of claim 15 wherein said means for attaching a fishhook comprises a pair of apertures, each of said apertures being symmetrically provided near the rear edge of each of said spoon elements.

18. The fishing lure of claim 17 wherein said means for attaching a fishhook further includes a ring member which extends through said pair of apertures, 19. The fishing lure of claim 15 wherein the extreme rear portions of said spoon elements are generally shaped like the caudal fin of a fish.

20. The fishing lure of claim 15 wherein appendages are symmetrically provided along said side edges of said spoon elements imitating the various fins of fish.

* * * * *